May 12, 1942.  R. A. HENNING  2,282,652
HYDRAULIC DEVICE
Filed July 18, 1941
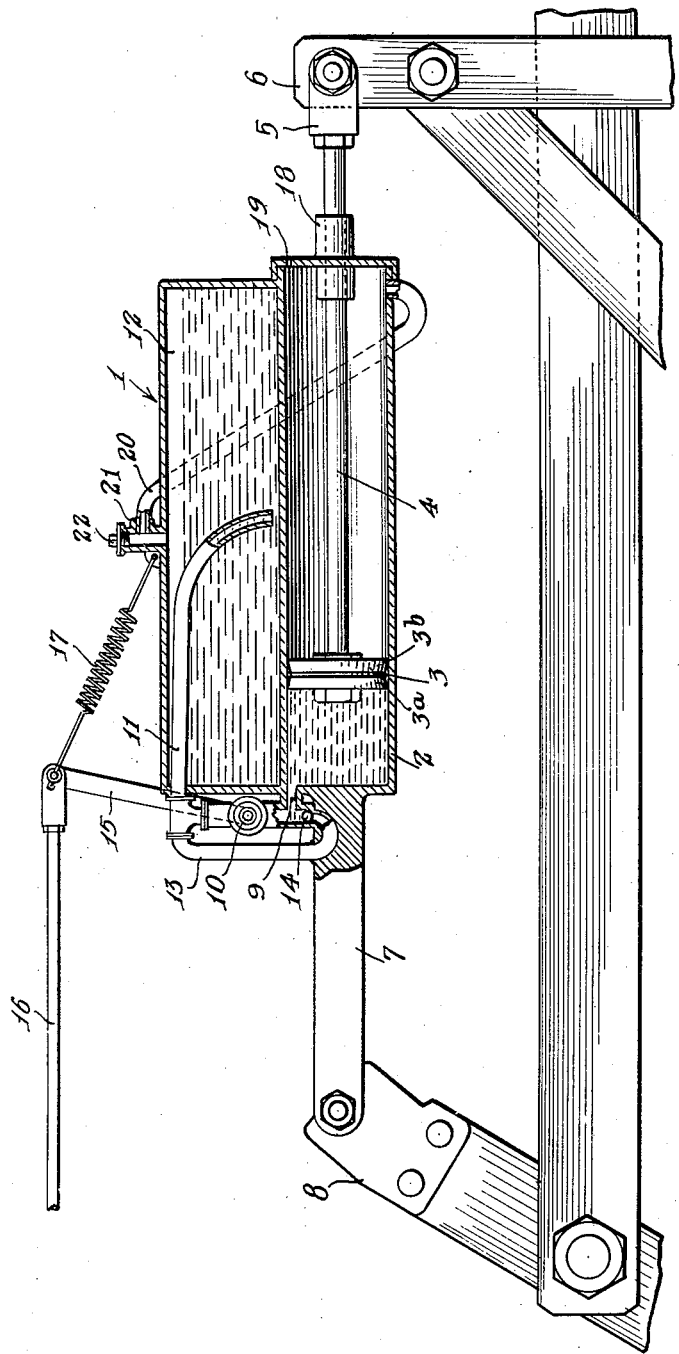
Inventor
Raymond A. Henning
By
Lyon & Lyon Attorneys Patented May 12, 1942

2,282,652

UNITED STATES PATENT OFFICE 2,282,652

HYDRAULIC DEVICE

Raymond A. Henning, Piru, Calif., assignor of seventy-five per cent to Charles S. Johnson, Piru, Calif.

Application July 18, 1941, Serial No. 402,978

5 Claims. (Cl. 188—94)

This invention relates to hydraulic devices in which liquid is recurrently transferred back and forth between a cylinder and a reservoir to control movement of a piston in the cylinder.

A broad object of the invention is to prevent loss of fluid in a hydraulic system of the type described.

A more specific object is to prevent loss of fluid in a system of the type described without resorting to the use of packed joints between moving parts.

The manner in which the foregoing objects are attained will now be explained by describing in detail an application of the invention to a hydraulic lock as depicted in the single figure of the attached drawing.

Referring to the drawing a hydraulic unit 1, in accordance with the invention, comprises a cylinder 2 having a piston 3 therein secured to a piston rod 4, which extends through the right end of the cylinder 2 and is connected by a clevis 5 to a member 6. The cylinder 2 has an extension 7 on its left end which is pivotally secured to a member 8.

The members 6 and 8 happen to constitute relatively movable members of a scraper which are movable toward and away from each other to control the action of the scraper. It is desirable under certain conditions to be able to separate the members 6 and 8 and to hold them separated against substantial forces that are generated by the scraper. The device 1 constitutes a hydraulic lock which permits the members 6 and 8 to be moved apart and held against return by fluid confined in the cylinder 2 between the left end thereof and the piston 3.

Thus the left end of the cylinder 2 communicates through a passage 9, a manually operated valve 10, and a pipe 11, with the bottom of a liquid reservoir 12, which is mounted on and formed integrally with the cylinder 2. A pipe 13 and a check valve 14 provide a by-pass around the manual valve 10 for flow of fluid in one direction only, namely, from the reservoir 12 into the cylinder 2. Reverse flow from the cylinder back into the reservoir cannot occur unless the manual valve 10 is open. This valve is shown as having a control arm 15 that may be controlled from a distance through a rod 16. A tension spring 17 normally maintains the valve closed.

The right end of the cylinder 2, through which the piston rod 4 passes, is preferably provided with a re-entrant guide 18 of substantial length for maintaining the rod in alignment with the cylinder, but this guide is not packed. A small breather hole 19 may be provided in the upper portion of the right end of the cylinder to permit air pressure in the right end of the cylinder to equalize following movement of the piston 3. A pipe 20 communicates the lower, right end portion of the cylinder 2 with the reservoir 12. Thus the pipe 20 is shown extended into a filler pipe 21 on the reservoir, which filler pipe is normally closed at its upper end by a plug 22.

The structure described functions as follows:

Whenever the parts 6 and 8 are moved away from each other, by the operation of the rest of the scraper mechanism, not shown, the piston 3 is withdrawn from the left end of the cylinder and draws in liquid from the reservoir 12 through the pipe 11, the pipe 13 past the check valve 14 and through the passage 9. Thereafter, so long as the valve 10 is closed, return movement of the parts 6 and 8 toward each other is prevented by the liquid filling the left end of the cylinder. However, when it is desired to permit the parts 6 and 8 to again approach each other, the valve 10 is opened by pulling on the rod 16, which permits free return of the liquid from the cylinder through the passages 9 and 10 back into the reservoir 12.

The piston 3 may be packed, and as shown in the drawing, this packing consists of a pair of oppositely facing piston cups 3a and 3b. However, it quite often happens that after considerable service pistons of this type are no longer perfectly tight, and some leakage of liquid occurs past the piston from the left end into the right end of the cylinder. The present invention prevents the loss of this liquid, by returning it to the reservoir 12 before it can accumulate in any appreciable amount. This return is effected through the pipe 20.

Thus, assume that a small amount of liquid has leaked past the piston 3 and accumulated in the bottom of the right end of the cylinder 2. Now assume that in accordance with normal operation of the device the members 6 and 8 are moved away from each other, causing the piston 3 to move to the right relative to the cylinder 2. This draws liquid from the reservoir 12 into the left end of the cylinder 2, as previously described. The movement of the liquid out of the reservoir produces a suction through the conduit 20 to draw any liquid in the right end of the cylinder back into the reservoir 12. The amount of liquid that may have accumulated in the right end of the cylinder is usually very limited, and following the discharge of this liquid, air will be drawn through the pipe 20 into the reservoir 12 to displace the liquid that was drawn into the left end of the cylinder from the reservoir.

If the apparatus is subject to violent movement, some liquid may be sloshed from the reservoir 12 through the pipe 20, into the right end of the cylinder 2. However, this is not objectionable, since the liquid will be returned to the reservoir during the normal operation of the device, as previously described.

As shown, the cylinder 2 is positioned substantially horizontally, and the right end of the cylinder is closed except for the vent hole 19 and the clearance around the piston rod 4, where it passes through the re-entrant guide 18. So long as the cylinder is horizontal, a relatively large amount of liquid would have to accumulate in the right end of the cylinder before it could flow out through the piston rod guide 18. Leakage of liquid through the guide 18 is further inhibited, even should the cylinder dip at the right end, by the re-entrant character of the guide 18, whereby it extends inwardly away from the end of the cylinder.

It is to be understood that although for the purpose of explaining the invention a specific application thereof has been described in detail, the invention is not limited to hydraulic locks of the particular type described, but is of general application in any hydraulic device where liquid is recurrently transferred between a reservoir and one end of a cylinder. The invention is, therefore, to be limited only as set forth in the appended claims.

I claim:

1. In a hydraulic device comprising a cylinder having a piston movable therein, a closed liquid reservoir and fluid connection means for movement of liquid between said reservoir and one end of said cylinder accompanied by movement of the piston in the cylinder, the construction including a conduit extending from the lower part of the other end of said cylinder to the upper portion of said reservoir, whereby movement of said piston toward said other end of said cylinder draws liquid out of said reservoir into said one end of said cylinder, thereby producing a suction in said conduit to draw any liquid collected in the said other end of the cylinder back into said reservoir.

2. The construction described in claim 1, including vent means connecting the upper part of said other end of said cylinder to the atmosphere, whereby said reservoir is vented through said conduit.

3. Apparatus as described in claim 1, in which said cylinder is positioned approximately horizontally.

4. In combination, a hydraulic cylinder having a piston therein and a piston rod extending through one end of said cylinder, a liquid reservoir, liquid connection means between said reservoir and the other end of said cylinder, and means connecting the lower part of said cylinder adjacent said one end to the upper part of said reservoir, the end wall in said one end of said cylinder having a reentrant piston rod guide for inhibiting leakage of liquid through said guide around said piston rod.

5. In combination, a hydraulic cylinder having a piston therein and a piston rod extending through one end of said cylinder, a liquid reservoir partially filled with liquid, liquid connection means connecting the lower portion of said reservoir with the other end of said cylinder whereby reciprocation of said piston is accompanied by flow of liquid between the reservoir and said other end of said cylinder, and auxiliary connecting means connecting said one end of said cylinder to said reservoir at a point above the liquid level therein, said one end of said cylinder having a vent therein at a higher level than the point of connection of said auxiliary connecting means thereto, whereby air can circulate between the atmosphere and said reservoir through said one end of said cylinder, and whereby liquid in said one end of said cylinder is returned to said reservoir instead of being discharged from said vent.

RAYMOND A. HENNING.